(12) United States Patent
Schmidt

(10) Patent No.: US 10,824,447 B2
(45) Date of Patent: *Nov. 3, 2020

(54) CONTENT PRESENTATION WITH ENHANCED CLOSED CAPTION AND/OR SKIP BACK

(71) Applicant: INTEL CORPORATION, Santa Clara, CA (US)

(72) Inventor: Johannes P. Schmidt, Los Altos Hills, CA (US)

(73) Assignee: INTEL CORPORATION, Santa Clara, CA (US)

(*) Notice: Subject to any disclaimer, the term of this patent is extended or adjusted under 35 U.S.C. 154(b) by 175 days.

This patent is subject to a terminal disclaimer.

(21) Appl. No.: 16/183,000

(22) Filed: Nov. 7, 2018

(65) Prior Publication Data

US 2019/0073231 A1  Mar. 7, 2019

Related U.S. Application Data

(63) Continuation of application No. 15/280,180, filed on Sep. 29, 2016, now Pat. No. 10,127,058, which is a continuation of application No. 13/791,531, filed on Mar. 8, 2013, now Pat. No. 9,471,334.

(51) Int. Cl.
*G06F 9/451* (2018.01)
*H04N 5/445* (2011.01)
*H04N 21/488* (2011.01)
*H04N 21/6587* (2011.01)
(Continued)

(52) U.S. Cl.
CPC ......... *G06F 9/451* (2018.02); *H04N 5/44513* (2013.01); *H04N 21/4405* (2013.01); *H04N 21/4884* (2013.01); *H04N 21/6587* (2013.01); *H04N 21/8456* (2013.01); *H04N 2005/44526* (2013.01)

(58) Field of Classification Search
None
See application file for complete search history.

(56) References Cited

U.S. PATENT DOCUMENTS

| 6,871,006 B1* | 3/2005 | Oguz | G11B 27/031 348/E7.073 |
| 8,234,411 B2* | 7/2012 | Gilson | G11B 27/005 709/246 |
| 9,313,544 B2* | 4/2016 | Besehanic | H04H 60/43 |

(Continued)

*Primary Examiner* — William L Bashore
*Assistant Examiner* — Nathan K Shrewsbury

(57) ABSTRACT

Apparatuses, methods and storage medium associated with content consumption are disclosed herein. In embodiments, an apparatus may include a decoder, a user interface engine, and a presentation engine. The decoder may be configured to receive and decode a streaming of the content. The user interface engine may be configured to receive user commands. The presentation engine may be configured to present the content as the content is decoded from the stream, in response to received user commands. Further, the decoder, the user interface engine, the presentation engine, and/or combination/sub-combination thereof, may be arranged to adapt the presentation to enhance user experience during response to a skip back command, where the adaption is in addition to a nominal response to the skip back command, e.g., display of closed captions. Other embodiments may be described and/or claimed.

20 Claims, 5 Drawing Sheets

(51) Int. Cl.
*H04N 21/845* (2011.01)
*H04N 21/4405* (2011.01)

(56) References Cited

U.S. PATENT DOCUMENTS

| | | | |
|---|---|---|---|
| 2003/0068158 A1* | 4/2003 | Kudou | G11B 27/005 386/244 |
| 2003/0113096 A1* | 6/2003 | Taira | H04N 9/8042 386/230 |
| 2004/0143434 A1* | 7/2004 | Divakaran | G06F 16/785 704/256 |
| 2007/0154171 A1* | 7/2007 | Elcock | H04N 21/4828 386/230 |
| 2008/0086754 A1* | 4/2008 | Chen | H04N 21/21815 725/105 |
| 2008/0129864 A1* | 6/2008 | Stone | H04N 21/43615 348/468 |
| 2008/0141303 A1* | 6/2008 | Walker | H04N 21/44227 725/39 |
| 2008/0279535 A1* | 11/2008 | Haque | H04N 21/2355 386/244 |
| 2009/0167940 A1* | 7/2009 | Card, II | H04N 21/4884 348/468 |
| 2009/0307741 A1* | 12/2009 | Casagrande | H04N 21/435 725/137 |
| 2014/0064711 A1* | 3/2014 | Ziskind | H04N 21/8456 386/353 |
| 2014/0258862 A1* | 9/2014 | Schmidt | G06F 9/451 715/716 |
| 2016/0037223 A1* | 2/2016 | Casagrande | H04N 21/47217 386/230 |
| 2017/0127142 A1* | 5/2017 | Schmidt | H04N 21/8456 |
| 2019/0073231 A1* | 3/2019 | Schmidt | H04N 21/4884 |

* cited by examiner

CONTENT PRESENTATION WITH ENHANCED CLOSED CAPTION AND/OR SKIP BACK

CROSS-REFERENCE TO RELATED APPLICATIONS

This application is a continuation of, claims the benefit of and priority to previously filed U.S. patent application Ser. No. 15/280,180 filed Sep. 29, 2016, entitled "CONTENT PRESENTATION WITH ENHANCED CLOSED CAPTION AND/OR SKIP BACK", which is a continuation of previously filed U.S. patent application Ser. No. 13/791,531 filed on Mar. 8, 2013, and now issued as U.S. Pat. No. 9,471,334; both of the above are incorporated herein by reference in their entirety.

TECHNICAL FIELD

The present disclosure relates to the field of data processing, in particular, to apparatuses, methods and storage medium associated with content presentation.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Advances in computing, networking and related technologies have led to proliferation in the availability of multi-media contents, and the manners the contents are consumed. Today, multi-media contents may be available from fixed medium (e.g., Digital Versatile Disk (DVD)), broadcast, cable operators, satellite channels, Internet, and so forth. User may consume contents with a television set, a laptop or desktop computer, a tablet, a smartphone, or other devices of the like. In addition to the contents themselves, ease of consumption remains an important factor to the overall user experience and satisfaction.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
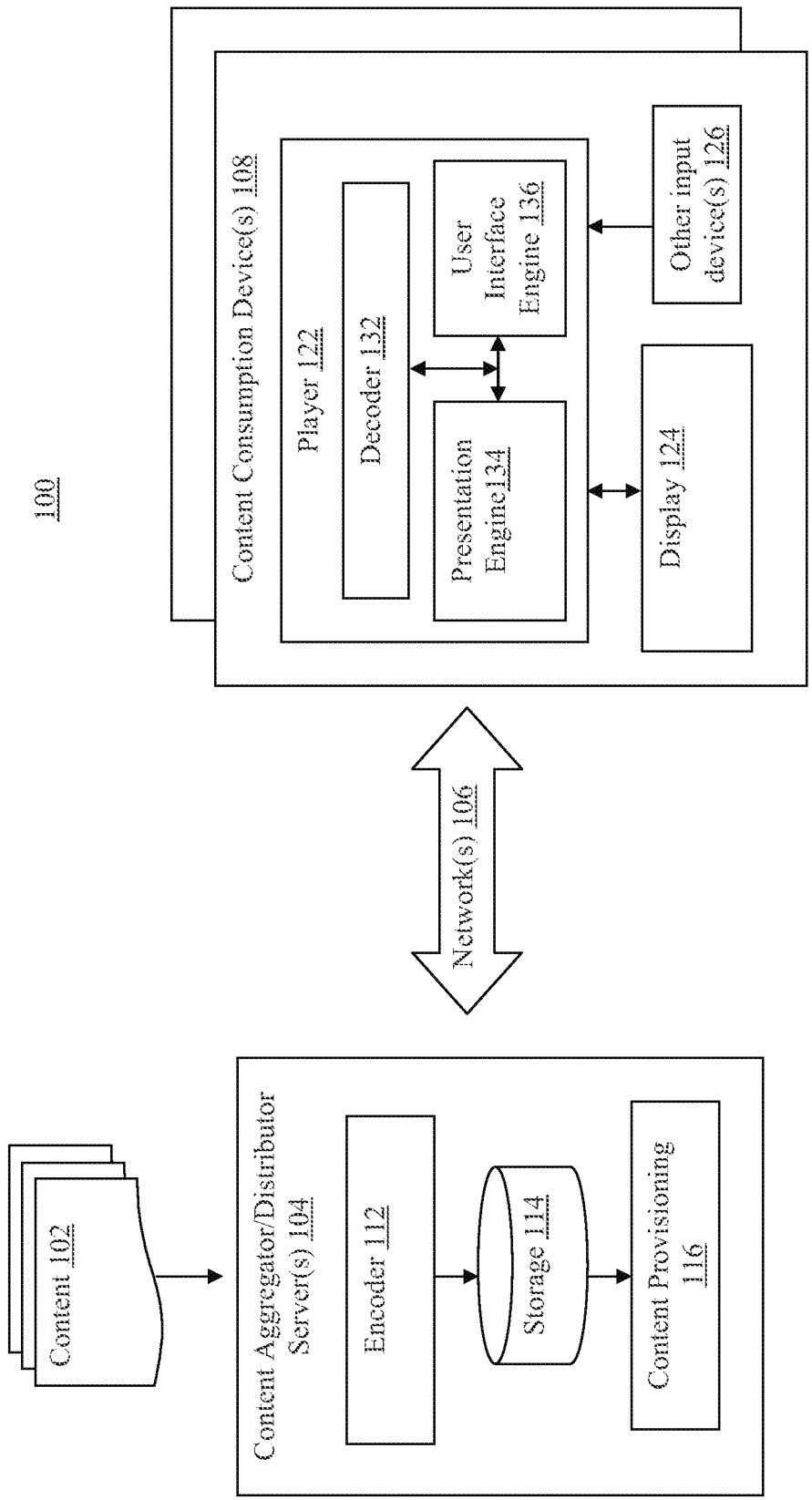
FIG. 1 illustrates an arrangement for content distribution and consumption, in accordance with various embodiments.

Apparatuses, methods and storage medium associated with content distribution and/or consumption are disclosed herein. In embodiments, an apparatus, e.g., a set-top box, may include a decoder, a user interface engine, and a presentation engine. The decoder may be configured to receive and decode a streaming of a content, e.g., an audio/video program. The user interface engine may be configured to receive user commands. The presentation engine may be configured to present the content as the content is decoded and recovered from the stream, in response to received user commands. Further, the decoder, the user interface engine, the presentation engine, and/or combination/sub-combination thereof, may be arranged to adapt the presentation to enhance user experience during response to a skip back command to skip the presentation back to prior point in time. The adaptation may include, e.g., showing an amount of closed captions and/or subtitles, in addition to rolling the presentation back to the prior point in time or thereabout.

In embodiments, the closed captions and/or subtitles may be presented regardless whether the content is being presented with or without closed captions/subtitles at the time the skip command is received. In embodiments, to facilitate substantially instantaneous provision of the closed captions/subtitles, a sufficient amount of closed captions/subtitles is continuously cached.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the term "module" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality. The term "closed captions" is to include traditional closed captions and/or subtitles.

Referring now FIG. 1, wherein an arrangement for content distribution and consumption, in accordance with various embodiments, is illustrated. As shown, in embodiments, arrangement 100 for distribution and consumption of content may include a number of content consumption devices 108 coupled with one or more content aggregation/distribution servers 104 via one or more networks 106. Content aggregation/distribution servers 104 may be configured to aggregate and distribute contents to content consumption devices 108 for consumption, via one or more networks 106. As will be described in more detail below, content aggregation/distribution servers 104 and/or content consumption devices 108 may be incorporated with various teachings of the present disclosure to provide users of content consumption devices 108 with potentially enhanced user experience.

In embodiments, as shown, content aggregation/distribution servers 104 may include encoder 112, storage 114 and content provisioning 116, coupled to each other as shown. Encoder 112 may be configured to encode contents 102 from various content providers, and storage 114 may be configured to store encoded content. Content provisioning 116 may be configured to selectively retrieve and stream encoded content to the various content consumption devices 108 in response to requests from the various content consumption devices 108.

Contents 102 may be multi-media contents of various types, having video, audio, and/or closed captions, from a variety of content creators and/or providers. Examples of contents may include, but are not limited to, movies, TV programming, user created contents (such as YouTube video, iReporter video), music albums/titles/pieces, and so forth. Examples of content creators and/or providers may include, but are not limited to, movie studios/distributors, television programmers, television broadcasters, satellite programming broadcasters, cable operators, online users, and so forth.

In embodiments, for efficiency of operation, encoder 112 may be configured to transcode the various contents 102, typically in different encoding formats, into a subset of one or more common encoding formats. However, encoder 112 may be configured to nonetheless maintain indices or cross-references to the corresponding contents in their original encoding formats. Similarly, for flexibility of operation, encoder 112 may transcode or otherwise process each or selected ones of contents 102 into multiple versions of different quality levels. The different versions may provide different resolutions, and/or require different bit rates and/or frame rates for transmission and/or playing. In various embodiments, the encoder 112 may publish, or otherwise make available, information on the available different resolutions, different bitrates, and/or different frame rates. For example, the encoder 112 may publish bitrates at which it may provide video or audio content to the content consumption device(s) 108. Encoding of audio data may be performed in accordance with, e.g., but are not limited to, the MP3 standard, promulgated by the Moving Picture Experts Group (MPEG). Encoding of video and/or audio data may be performed in accordance with, e.g., but are not limited to, the H264 standard, promulgated by the International Telecommunication Unit (ITU) Video Coding Experts Group (VCEG). Encoder 112 may include one or more computing devices configured to perform content portioning, encoding, and/or transcoding, such as described herein.

Storage 114 may be temporal and/or persistent storage of any type, including, but are not limited to, volatile and non-volatile memory, optical, magnetic and/or solid state mass storage, and so forth. Volatile memory may include, but are not limited to, static and/or dynamic random access memory. Non-volatile memory may include, but are not limited to, electrically erasable programmable read-only memory, phase change memory, resistive memory, and so forth.

Content provisioning 116 may, in various embodiments, be configured to provide encoded content as discrete files and/or as continuous streams of encoded content. Content provisioning 116 may be configured to transmit the compressed audio/video data (and closed captions, if provided) in accordance with any one of a number of streaming and/or transmission protocols. The streaming protocols may include, but are not limited to, the Real-Time Streaming Protocol (RTSP). Transmission protocols may include, but are not limited to, the transmission control protocol (TCP), user datagram protocol (UDP), and so forth.

Figure 2:
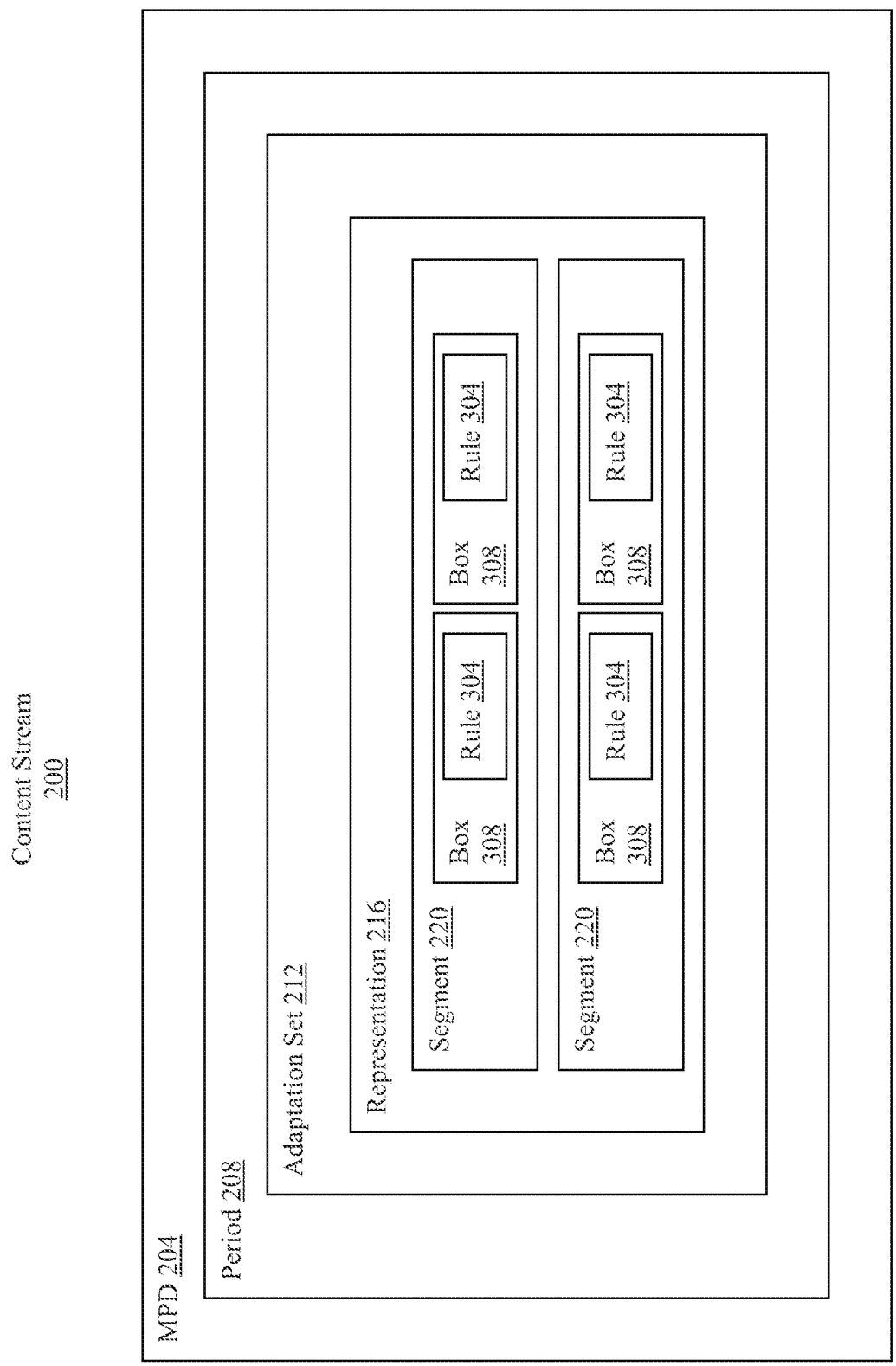
FIG. 2 illustrates a content stream in further detail, in accordance with various embodiments.

Referring now also to FIG. 2, wherein an example content stream, in accordance with various embodiments, is illustrated. As described earlier, content 102 may be encoded by encoder 112 into different versions having different bit rates, channels, sizes, or some other parameter which may generally or collectively referred to as a QoS parameter defining a QoS level. Each version of the encoded content stream 200 may be divided into discrete segments which can then be selectively requested by the content consumption device 108. For example, the content consumption device 108 may send a request via hypertext transfer protocol (HTTP) or some other internet protocol to a server such as a content aggregator/distributor server 104. The content aggregator/distributor server 104 may respond by providing the requested segment.

A potential benefit of the content 102 being encoded into different versions according to multiple different QoS parameters and QoS levels may be realized when content consumption device 108 detects that a lower QoS level is necessary, or a higher QoS level is permissible, then the content consumption device 108 may simply request a segment at a different QoS level. Similarly, the content consumption device 108 may request different segments if a viewer of the content 102 requests additional features such as different audio streams, closed captioning, or the like. The content aggregator/distributor server 104 may respond by supplying the segment at the different QoS level, rather than having to supply and re-buffer the entire content 102. This allows the viewing of the content 102 to take place in a more dynamic fashion without lengthy buffering or re-buffering periods.

In embodiments, the encoded content 200 may include a media presentation description (MPD) 204 document. The MPD may describe a sequence of periods 208 that represent a content period during which a consistent set of encoded versions of the content is available. In other words, the set of available bitrates, languages, captions, subtitles, or other QoS parameters or QoS levels may remain unchanged during the period 208. Although only a single period 208 is depicted in FIG. 2, other embodiments may have an MPD 204 with multiple periods, each having different available bitrates, languages, captions, subtitles, or other QoS parameters or QoS levels. In embodiments, the captions may be in multiple languages.

Within a period 208, the content may be arranged into adaptation sets 212. The adaptation set 212 may represent a set of interchangeable encoded versions of one or several content components such as a video component, an audio component, etc. Other components such as captions or audio descriptions may likewise have a separate adaptation set 212. Although only a single adaptation set 212 is shown in FIG. 2, in other embodiments each period 208 may comprise a plurality of adaptation sets 212.

Each adaptation set 212 may comprise one or more representations 216. A representation may describe the deliverable encoded versions of one or several content components of the content 102. For example, a representation 216 may include one or more streams for each content component such as audio components, video components, captions, or audio descriptions. In general, any single representation 216 within an adaptation set 212 may be sufficient to render the contained content components. In embodiments, each adaptation set 212 may include a plurality of representations 216.

Each representation 216 may be divided into one or more segments 220 and 224. In general, a segment 220 and 224 may be considered to be the largest unit of the encoded content 200 that may be retrieved by a single HTTP request. In embodiments, the segment 220 may have a different length or duration than segment 224. In some embodiments, the segment length may vary between representations such that the length of segment 220 and 224 in representation 216 may be on the order of a few seconds, while in another representation the length of a segment may be as long as the length of the representation or some value in between.

In embodiments, each segment such as segment 220 or segment 224 may be encoded according to an ISO base media file format such as that defined in ISO/IEC 14496-12:2012. Specifically, each segment such as segment 220 or segment 224 may comprise a plurality of boxes 308 and 304 or 236 and 240 respectively. In some embodiments the boxes, for example box 308, may comprise a presentation rule 324, that governs the presentation of one or more segments.

Referring back to FIG. 1, networks 106 may be any combinations of private and/or public, wired and/or wireless, local and/or wide area networks. Private networks may include, e.g., but are not limited to, enterprise networks. Public networks, may include, e.g., but is not limited to the Internet. Wired networks, may include, e.g., but are not limited to, Ethernet networks. Wireless networks, may include, e.g., but are not limited to, Wi-Fi, or 3G/4G networks. It would be appreciated that at the content distribution end, networks 106 may include one or more local area networks with gateways and firewalls, through which servers 104 go through to communicate with content consumption devices 108. Similarly, at the content consumption end, networks 106 may include base stations and/or access points, through which consumption devices 108 communicate with servers 104. In between the two ends may be any number of network routers, switches and other networking equipment of the like. However, for ease of understanding, these gateways, firewalls, routers, switches, base stations, access points and the like are not shown.

In embodiments, as shown, a content consumption device 108 may include player 122, display 124 and user input device 126. Player 122 may be configured to receive streamed content, decode and recovered the content from the content stream, and present the recovered content on display 124, in response to user selections/inputs from user input device 126. Further, player 122 may be configured to adapt the presentation of a content to enhance user experience during response to some user commands, where the adaptation is in addition to a nominal response to the user commands. In embodiments, player 122 may be configured to adapt the presentation of a content to enhance user experience during response to a skip back command, skipping presentation back to a prior point in time. The adaptation, in addition to the nominal response of skipping back to the prior point in time, may include presentation of an amount of closed captions, regardless whether the content is being presented with closed captions at the time the skip command is received. Similarly, for enhancing user experience, player 122 may be configured to partially respond to one or more other user commands in view of one or more rules associated with presentation of the content.

In embodiments, player 122 may include decoder 132, presentation engine 134 and user interface engine 136. Decoder 132 may be configured to receive streamed content, decode and recover the content from the content stream. Presentation engine 134 may be configured to present the recovered content on display 124, in response to user selections/inputs. User interface engine 136 may be configured to receive the user selections/inputs from a user.

Further, in various embodiments, decoder 132, presentation engine 136, and user engine 136, combinations or sub-combinations thereof, may be configured to effectuate for player 122 the earlier described adaptation of the presentation of a content to enhance user experience during response to some user commands, where the adaptation is in addition to a nominal response to the user commands. See e.g. U.S. patent application Ser. No. 13/727,138, entitled "CONTENT PRESENTATION WITH ENHANCED USER EXPERIENCE," filed Dec. 26, 2012, for further details. Similarly, decoder 132, presentation engine 136, and user engine 136, combinations or sub-combinations thereof, may also be configured to effectuate for player 122 the earlier described partial response to one or more other user commands in view of one or more rules associated with presentation of the content to enhance user experience.

While shown as part of a content consumption device 108, display 124 and/or user input device(s) 126 may be stand-alone devices or integrated, for different embodiments of content consumption devices 108. For example, for a television arrangement, display 124 may be a stand alone television set, Liquid Crystal Display (LCD), Plasma and the like, while player 122 may be part of a separate set-top set, and other user input device 126 may be a separate remote control or keyboard. Similarly, for a desktop computer arrangement, player 122, display 124 and other input device(s) 126 may all be separate stand alone units. On the other hand, for mobile computing arrangements, like a laptop, ultrabook, tablet or smartphone, player 122, display 124 and other input devices 126 may be integrated together into a single form factor. Further, for tablet or smartphone, a touch sensitive display screen may also server as one of the other user input device(s) 126, and player 122 may be a computing platform with a soft keyboard that also include one of the user input device(s) 126.

Figure 3:
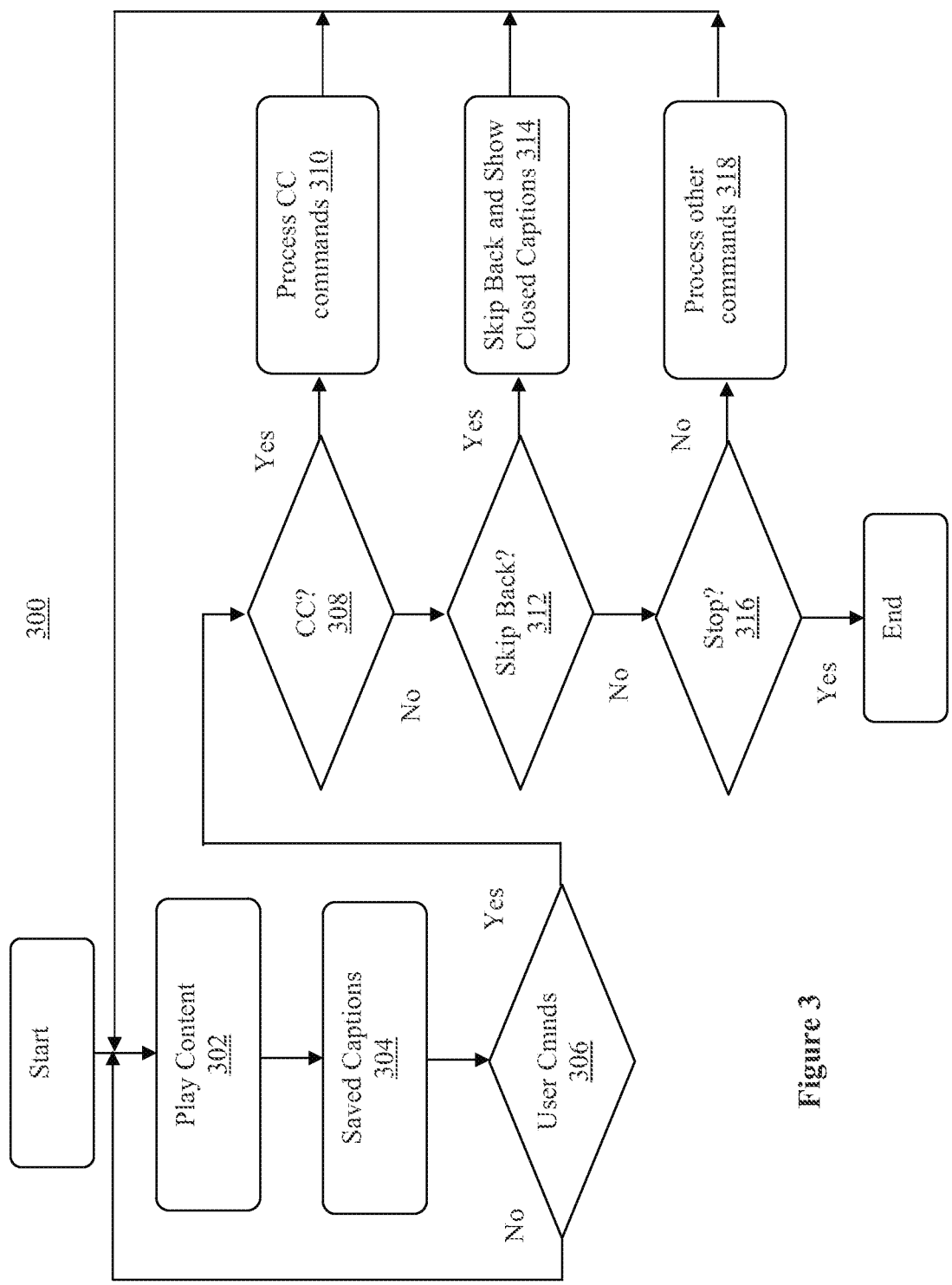
FIG. 3 illustrates an example process for presenting content, in accordance with various embodiments.

Referring now to FIG. 3, wherein an example process for presenting content, in accordance with various embodiments, is illustrated. As shown, process 300 may start at block 302, where content may be played. As described earlier, content playing may include presentation of content recovered from a received content stream, e.g., by presentation engine 134, onto a display device, e.g., display 124. From block 302, the process may proceed to block 304. In block 304, a configurable amount of the closed captions associated with the content being played may be continuously cached. The closed captions may be cached regardless whether the recovered content is being played with or without closed caption enabled. In embodiments, the closed captions may be cached before the closed captions are decoded, e.g., by decoder 132; in other words, cached in their encoded form. For these embodiments, the cached closed captions may be decoded when they are subsequently used. In other embodiments, the closed captions may be cached after they have been decoded, e.g., into bitmap form, by presentation engine 134. For these embodiments, the closed captions would be even more readily available when they are needed.

The amount cached may be coordinated with the amount needed for the enhanced response to the skip back command, and/or configurable. Player 122 may include features, e.g., in decoder 132, presentation engine 134, user interface engine 136 and/or combination/sub-combination thereof to configure the amount cached at installation time or post installation.

From block 304, process 300 may proceed to block 306. At block 306, process 300 may determine, e.g., by user interface engine 136, whether a user command has been received. If a result of the determination at block 306 indicates that no user command has been received, process 300 may return to block 302, and continue from there as earlier described. On the other hand, if a result of the determination at block 306 indicates a user command has been received, process 300 may proceed to block 308.

At block 308, process 300 may determine, e.g., by user interface engine 136, whether the received user command is the closed caption (CC) command. If a result of the determination at block 308 indicates that the received user command is the CC command, process 300 may proceed to block 310.

At block 310, process 300 may turn closed caption on, if closed caption is currently off, or turn closed caption off, if closed caption is currently on, e.g., by presentation engine 134 on notification by user interface engine 136. As described earlier, in embodiments, a configurable amount of closed captions is continuously cached. Thus, unlike conventional system where closed captions are saved only when the closed caption feature is turned on, closed captions for embodiments of the present disclosure may be presented almost instantaneously in response to the closed caption command to turn closed captions on. Thus, for these embodiments, the user may perceive enhanced experience. From block 310, process 300 may return to block 302 and from there, continue as earlier described.

On the other hand, if a result of the determination at block 308 indicates that the received user command is not the CC command, process 300 may proceed to block 312. At block 312, process 300 may determine, e.g., by user interface engine 136, whether the received user command is the skip back command. As described earlier, the skip back command may be configured to roll back the presentation to a prior point in time, e.g. by t seconds. If a result of the determination at block 312 indicates that the received user command is the skip back command, process 300 may proceed to block 314.

At block 314, process 300 may roll back presentation of the content by t seconds, e.g., by presentation engine 134 on notification by user interface engine 136. Additionally, in responding to the skip back command, process 300 may perform one or more operations to enhance user experience, where the operations are in addition to the nominal response to the skip back command. In particular, process 300 may present closed captions spanning T seconds that comprises the t seconds of skip back. For example, if t is 5 seconds, T may be a 10 second interval that includes the 5 seconds. In embodiments, the additional presentation of closed captions is made regardless whether the content is being presented with or without closed captions. Since users often skip back because they want to have better understanding and/or appreciation of the content they are consuming. The additional presentation of closed captions may assist the user in gaining that better understanding or appreciation. Thus, the additional presentation of closed captions may provide the user with enhanced experience. From block 314, process 300 may return to block 302 and from there, continue as earlier described.

Referring again to block 312, if a result of the determination indicates that the received user command is not a skip back command, process 300 may proceed to block 316. At block 316, process 300 may determine whether the received user command is a stop command. If a result of the determination at block 316 indicates that the received user command is not a stop command, process 300 may proceed to block 318, where the command may be processed accordingly. From block 318, process 300 may return to block 302 and from there, continue as earlier described.

On the other hand, if a result of the determination at block 314 indicates that the received command is a stop command, process 300 may end.

Figure 4:
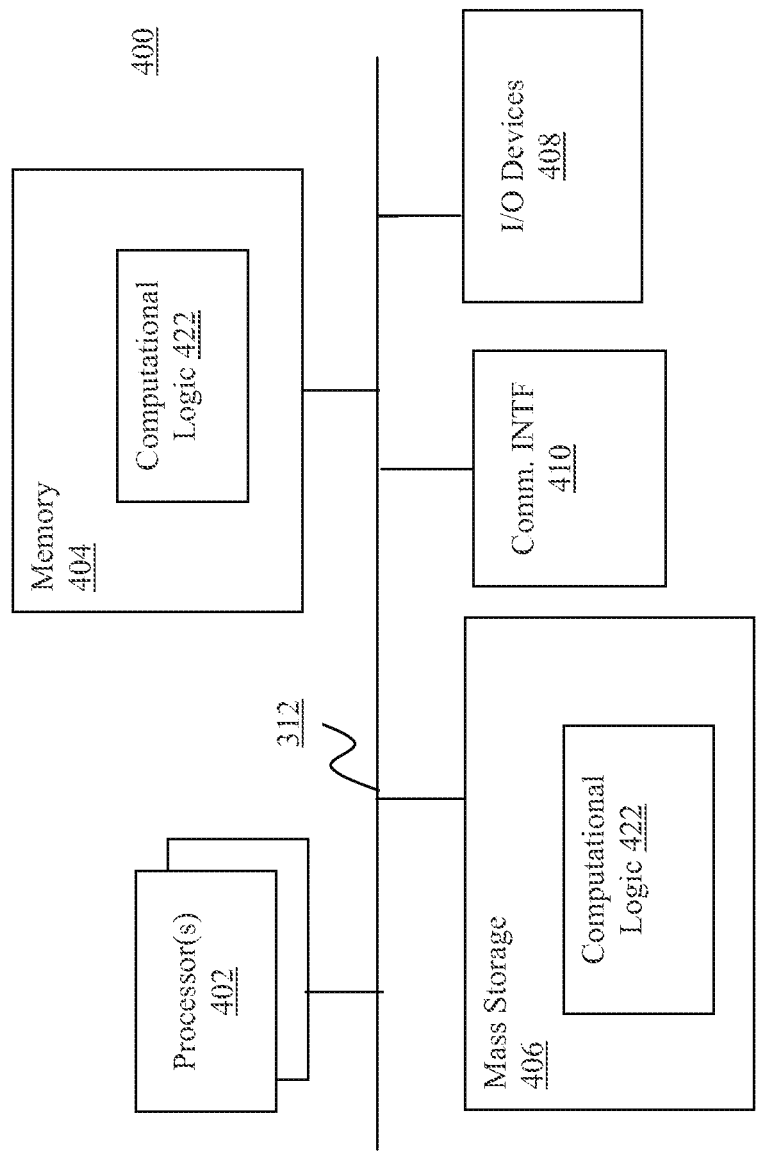
FIG. 4 illustrates an example computing environment suitable for practicing the disclosure, in accordance with various embodiments.

Referring now to FIG. 4, wherein an example computer suitable for use for the arrangement of FIG. 1, in accordance with various embodiments, is illustrated. As shown, computer 400 may include one or more processors or processor cores 402, and system memory 404. For the purpose of this application, including the claims, the terms "processor" and "processor cores" may be considered synonymous, unless the context clearly requires otherwise. Additionally, computer 400 may include mass storage devices 406 (such as diskette, hard drive, compact disc read only memory (CD-ROM) and so forth), input/output devices 408 (such as display, keyboard, cursor control and so forth) and communication interfaces 410 (such as network interface cards, modems and so forth). The elements may be coupled to each other via system bus 412, which may represent one or more buses. In the case of multiple buses, they may be bridged by one or more bus bridges (not shown).

Each of these elements may perform its conventional functions known in the art. In particular, system memory 404 and mass storage devices 406 may be employed to store a working copy and a permanent copy of the programming instructions implementing the operations associated with content aggregation/distribution servers 104 or content consumption devices 108, earlier described. The various elements may be implemented by assembler instructions supported by processor(s) 402 or high-level languages, such as, for example, C, that can be compiled into such instructions.

The permanent copy of the programming instructions may be placed into permanent storage devices 406 in the factory, or in the field, through, for example, a distribution medium (not shown), such as a compact disc (CD), or through communication interface 410 (from a distribution server (not shown)). That is, one or more distribution media having an implementation of the agent program may be employed to distribute the agent and program various computing devices.

The number, capability and/or capacity of these elements 410-412 may vary, depending on whether computer 400 is used as a content aggregation/distribution server 104 or a stationary or mobile content consumption device 108, such as set-top box, desktop computer, tablet, smartphone, ultrabook, laptop, and so forth. Their constitutions are otherwise known, and accordingly will not be further described.

Figure 5:
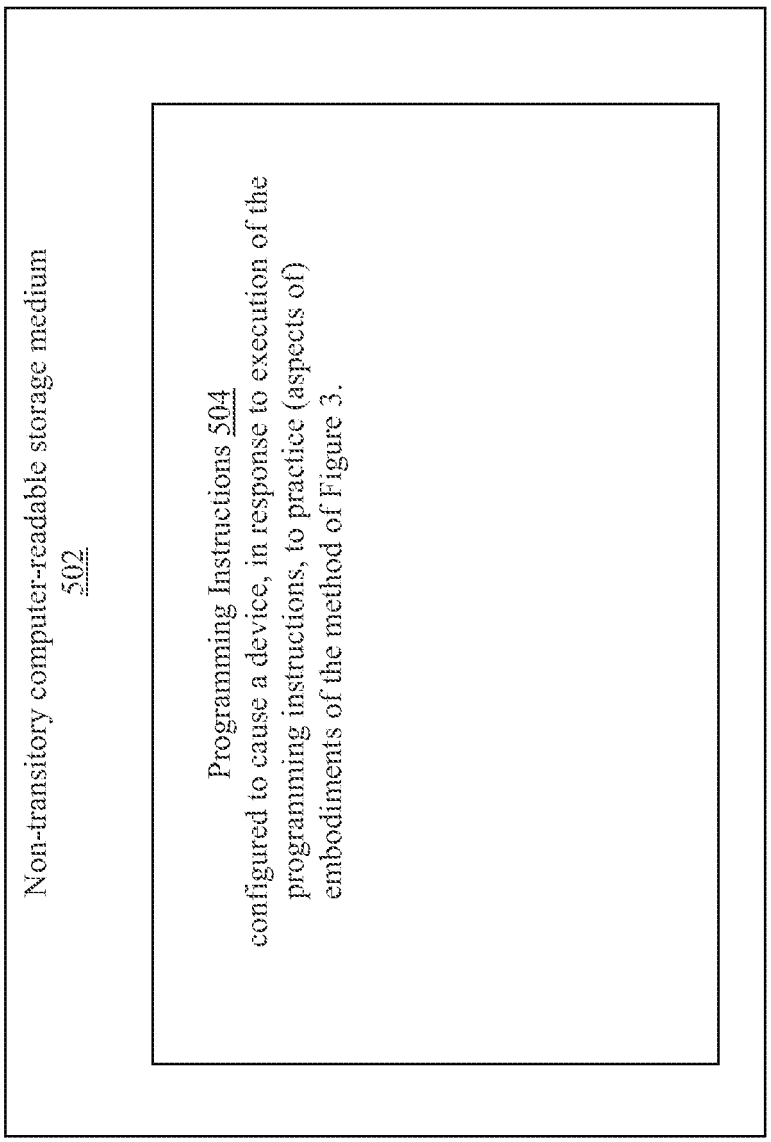
FIG. 5 illustrates an example storage medium with instructions configured to enable an apparatus to practice the present disclosure, in accordance with various embodiments.

FIG. 5 illustrates an example non-transitory computer-readable storage medium having instructions configured to practice all or selected ones of the operations associated with content aggregation/distribution servers 104 or content consumption devices 108, earlier described; in accordance with various embodiments. As illustrated, non-transitory computer-readable storage medium 502 may include a number of programming instructions 504. Programming instructions 504 may be configured to enable a device, e.g., computer 400, in response to execution of the programming instructions, to perform, e.g., various operations of process 300 of FIG. 3, e.g., but not limited to, the operations performed in association with providing closed captions or performed to enhance a user's experience while responding to a skip back command. In alternate embodiments, programming instructions 504 may be disposed on multiple non-transitory computer-readable storage media 502 instead.

Referring back to FIG. 4, for one embodiment, at least one of processors 402 may be packaged together with computational logic 422 (in lieu of storing in memory 404 and/or mass storage 406) configured to practice aspects of the process of FIG. 3. For one embodiment, at least one of processors 402 may be packaged together with computational logic 422 configured to practice aspects of the process of FIG. 3 to form a System in Package (SiP). For one embodiment, at least one of processors 402 may be integrated on the same die with computational logic 422 configured to practice aspects of the process of FIG. 3. For one embodiment, at least one of processors 402 may be packaged together with computational logic 422 configured to practice aspects of the process of FIG. 3 to form a System on Chip (SoC). For at least one embodiment, the SoC may be utilized in, e.g., but not limited to, a computing tablet.

Thus various embodiments of the present disclosure have been described including, but are not limited to:

Example 1 is an apparatus for consuming content. The apparatus may include a decoder configured to receive and decode a streaming of the content; a user interface engine configured to receive user commands; and a presentation engine coupled to the decoder and the user interface engine, and configured to present the content as the content is decoded from the stream, in response to received user commands. The decoder, the user interface engine, the presentation engine, individually, in combination or sub-combination, may be arranged to adapt the presentation to enhance user experience during response to a skip back command to skip back t units of time in the presentation of the content, wherein the adaptation is in addition to rolling the presentation back by at least t units of time.

Example 2 includes the subject matter of example 1, wherein the stream of content comprises closed captions; and wherein the decoder, the user interface engine, the presentation engine, individually, in combination or sub-combination, are arranged to additionally present closed captions spanning a time interval T that is greater than and comprises the t units of time.

Example 3 includes the subject matter of example 2, wherein the decoder, the user interface engine, or the presentation engine is configured to obtain T from one or more presentation rules associated with the stream of content.

Example 4 includes the subject matter of example 3, wherein the presentation rules are embedded with the stream of content, and the decoder, the user interface engine, the presentation engine, individually, in combination or sub-combination, are arranged to recover the one or more presentation rules from the stream of content.

Example 5 includes any one of the subject matters of examples 2-4, wherein the decoder, the user interface engine, the presentation engine, individually, in combination or sub-combination, are arranged to continuously cache closed captions for a rolling play time interval that is greater than the time interval T.

Example 6 includes any one of the subject matters of examples 2-4, wherein the decoder, the user interface engine, the presentation engine, individually, in combination or sub-combination, are arranged to present closed captions spanning the time interval T regardless of whether the presentation is presented with closed captions when the skip back command is received.

Example 7 includes any one of the subject matters of examples 1-4, wherein the apparatus is a selected one of set-top box, a television, a desktop computer, a laptop computer, an ultrabook, a computing tablet, or a smartphone.

Example 8 is one or more one storage medium comprising a plurality of instructions configured to cause a content consumption device, in response to execution of the instructions by the content consumption device, to decode a streaming of the content and receive user commands. The instructions may further cause the content consumption device to present the content as the content is decoded from the stream, in response to received user commands, including adaptation of the presentation to enhance user experience during response to a skip back command to skip back t units of time in the presentation of the content, wherein the adaptation is in addition to rolling the presentation back by at least t units of time.

Example 9 includes the subject matter of example 8, wherein the stream of content comprises closed captions; and wherein the instructions, in response to execution of the instructions by the content consumption device, cause the content consumption device to additionally present closed captions spanning a time interval T that is greater than and comprises the t units of time.

Example 10 includes the subject matter of example 9, wherein the instructions, in response to execution of the instructions by the content consumption device, cause the content consumption device to obtain T from one or more presentation rules associated with the stream of content.

Example 11 includes the subject matter of example 10, wherein the presentation rules are embedded with the stream of content, and t wherein the instructions, in response to execution of the instructions by the content consumption device, cause the content consumption device to recover the one or more presentation rules from the stream of content.

Example 12 includes the subject matter of any one of examples 9-11, wherein the instructions, in response to execution of the instructions by the content consumption device, cause the content consumption device to continuously cache closed captions for a rolling play time interval that is greater than the time interval T.

Example 13 includes the subject matter of any one of examples 9-11, wherein the instructions, in response to execution of the instructions by the content consumption device, cause the content consumption device to present closed captions spanning the time interval T regardless of whether the presentation is presented with closed captions when the skip back command is received.

Example 14 is a method for consuming content. The method may include decoding, with a decoder, a streaming of the content; receiving, with a user interface engine, user commands; and presenting the content as the content is decoded from the stream, with a presentation engine, in response to received user commands. The decoding, receiving and presenting include adapting the presentation to enhance user experience during response to a skip back command to skip back t units of time in the presentation of the content, and wherein the adaptation is in addition to rolling the presentation back by at least t units of time.

Example 15 includes the subject matter of example 14, wherein the stream of content comprises closed captions; and wherein the adaptation comprises additionally present closed captions spanning a time interval T that is greater than and comprises the t units of time.

Example 16 is an apparatus for consuming content. The apparatus may include a decoder configured to receive and decode a streaming of the content; a user interface engine configured to receive user commands; and a presentation engine coupled to the decoder and the user interface engine, and configured to present the content as the content is decoded from the stream, in response to received user commands. The decoder, the user interface engine, the presentation engine, individually, in combination or sub-combination, are arranged to cache an amount of closed captions provided with the content for subsequent use, notwithstanding the content is being presented without closed captions.

Example 17 includes the subject matter of example 16, wherein the decoder is configured to cache the amount of closed captions in encoded form.

Example 18 includes the subject matter of example 16, wherein the presentation engine is configured to cache the amount of closed captions in a decoded bit-map form.

Example 19 includes the subject matter of example 16, wherein the decoder, the user interface engine, the presentation engine, individually, in combination or sub-combination, are configured to enable the amount of closed captions cached to be configurable.

Example 20 includes the subject matter of any one of examples 16-19, wherein the amount of closed captions cached is set in coordination with an amount needed to provide enhanced user experience in responding to a skip back command.

Example 21 is one or more storage medium comprising a plurality of instructions configured to enable a content consumption device, in response to execution of the instructions, to: decode a streaming of content, wherein the content includes closed captions; receive user commands; and present the content as the content is decoded from the stream, with or without closed captions, in response to received user commands. The instructions may further cause the content consumption device to cache an amount of the closed captions for subsequent use, notwithstanding the content is being presented without closed captions.

Example 22 includes the subject matter of example 21, wherein the instructions, in response to execution of the instructions by the content consumption device, cause the content consumption device to cache the amount of closed captions in encoded form.

Example 23 includes the subject matter of example 21, wherein the instructions, in response to execution of the instructions by the content consumption device, cause the content consumption device to cache the amount of closed captions in a decoded bit-map form.

Example 24 includes the subject matter of example 21, wherein the instructions, in response to execution of the instructions by the content consumption device, cause the content consumption device to enable the amount of closed captions cached to be configurable.

Example 25 includes the subject matter of any one of examples 21-24, wherein the amount of closed captions cached is set in coordination with an amount needed to provide enhanced user experience in responding to a skip back command.

Example 26 is an apparatus for consuming content. The apparatus may include means for receiving and decoding a streaming of the content; means for receiving user commands; and means for presenting the content as the content is decoded from the stream, in response to received user commands. Further, one of said means or a combination of said means further comprises means for adapting the presentation to enhance user experience during response to a skip back command to skip back t units of time in the presentation of the content, wherein the adaptation is in addition to rolling the presentation back by at least t units of time.

Example 27 includes the subject matter of example 26, wherein the stream of content comprises closed captions; and wherein one of said means or a combination of said means further comprises means for additionally presenting closed captions spanning a time interval T that is greater than and comprises the t units of time.

Example 28 is an apparatus for consuming content. The apparatus may include means for receiving and decoding a streaming of the content; means for receiving user commands; and means for presenting the content as the content is decoded from the stream, in response to received user commands. Further, one of said means further comprises means for caching an amount of closed captions provided with the content for subsequent use, notwithstanding the content is being presented without closed captions.

Example 29 includes the subject matter of example 28, wherein said receiving and decoding means comprises means for caching the amount of closed captions in encoded form.

Example 29 includes the subject matter of example 28, wherein said presenting means comprises means for caching the amount of closed captions in a decoded bit-map form.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An apparatus, comprising:
   a processor; and
   memory coupled to the processor, the memory comprising instructions, which when executed by the processor, cause the processor to: decode multi-media content and closed captions from a multi-media content stream;
   cache the closed captions for a time interval T; and initiate presentation of the multi-media content for the time interval T;
   the memory comprising instructions that when executed by the processor cause the processor to:
   receive a command to initiate closed captions;
   roll the presentation back by a time interval t, the time interval t less than the time interval T; and
   initiate presentation of the closed captions with multi-media content from the time interval t.

2. The apparatus of claim 1, the memory comprising instructions that when executed by the processor cause the processor to roll the presentation back by a time interval t responsive to receiving a command to replay a portion of the multi-media content.

3. The apparatus of claim 1, the memory comprising instructions that when executed by the processor cause the processor to:
  receive a command to initiate closed captions; and
  initiate presentation of the closed captions with multi-media content responsive to receiving the command.

4. The apparatus of claim 3, the memory comprising instructions that when executed by the processor cause the processor to receive the command from a remote control or from a user interface.

5. The apparatus of claim 3, the command including an indication to replay the multi-media content for a time interval t, the memory comprising instructions that when executed by the processor cause the processor to initiate presentation of the closed captions with multi-media content from the time interval t.

6. The apparatus of claim 1, wherein the apparatus is a set-top box, a television, a desktop computer, a laptop computer, an ultrabook, a computing tablet, or a smartphone.

7. One or more non-transitory storage medium comprising a plurality of instructions, which when executed by a processor of a multi-media content device, cause the processor to:
  decode multi-media content and closed captions from a multi-media content stream;
  cache the closed captions for a time interval T; and
  initiate presentation of the multi-media content for the time interval T.

8. The one or more non-transitory storage medium of claim 7, the plurality of instructions comprising instructions that when executed by the processor cause the processor to:
  receive a command to initiate closed captions; and
  initiate presentation of the closed captions with multi-media content responsive to receiving the command.

9. The one or more non-transitory storage medium of claim 8, the plurality of instructions comprising instructions that when executed by the processor cause the processor to receive the command from a remote control or from a user interface.

10. The one or more non-transitory storage medium of claim 8, the command including an indication to replay the multi-media content for a time interval t, the plurality of instructions comprising instructions that when executed by the processor cause the processor to initiate presentation of the closed captions with multi-media content from the time interval t.

11. The one or more non-transitory storage medium of claim 7, wherein the multi-media content device is a set-top box, a television, a desktop computer, a laptop computer, an ultrabook, a computing tablet, or a smartphone.

12. A system comprising:
  a multi-media interface;
  a processor coupled to the multi-media interface;
  memory coupled to the processor, the memory comprising instructions, which when executed by the processor, cause the processor to:
    decode multi-media content and closed captions from a multi-media content stream;
    cache the closed captions for a time interval T; and
    initiate, via the multi-media interface, presentation of the multi-media content for the time interval T;
    receive a command to initiate closed captions;
    roll the presentation back by a time interval t, the time interval t less than the time interval T; and
    initiate presentation of the closed captions with multi-media content from the time interval t.

13. The system of claim 12, comprising a network interface coupled to the processor, the memory comprising instructions that when executed by the processor, cause the processor to receive the multi-media content stream via the network interface.

14. The system of claim 13, wherein the network interface is a wireless network interface, a cellular network interface, or a wired network interface.

15. The system of claim 13, the memory comprising instructions that when executed by the processor cause the processor to:
  receive a command to initiate closed captions; and
  initiate presentation of the closed captions with multi-media content responsive to receiving the command.

16. The system of claim 15, comprising an input device, the memory comprising instructions that when executed by the processor cause the processor to receive the command to initiate closed captions via the input device.

17. The system of claim 16, wherein the input device is a separate remote control.

18. The system of claim 16, wherein the input device is a touch sensitive display.

19. The system of claim 16, the command including an indication to replay the multi-media content for a time interval t, the memory comprising instructions that when executed by the processor cause the processor to initiate presentation of the closed captions with multi-media content from the beginning of the time interval t.

20. The system of claim 12, wherein the system is a set-top box, a television, a desktop computer, a laptop computer, an ultrabook, a computing tablet, or a smartphone.

* * * * *